June 16, 1959  J. GUARDINO  2,890,706
COMBINATION MANICURING IMPLEMENTS
Filed June 19, 1958
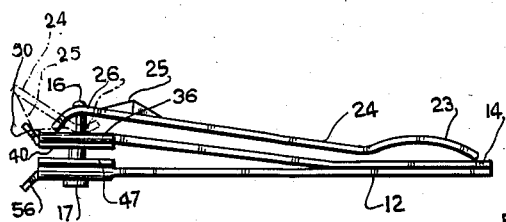
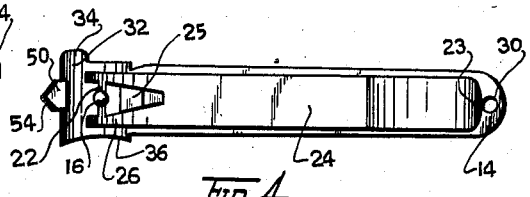
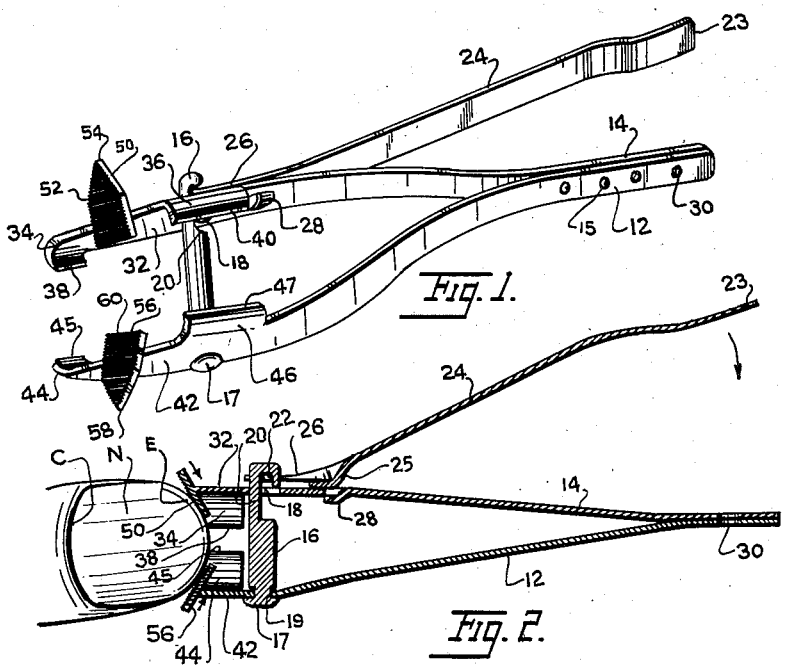
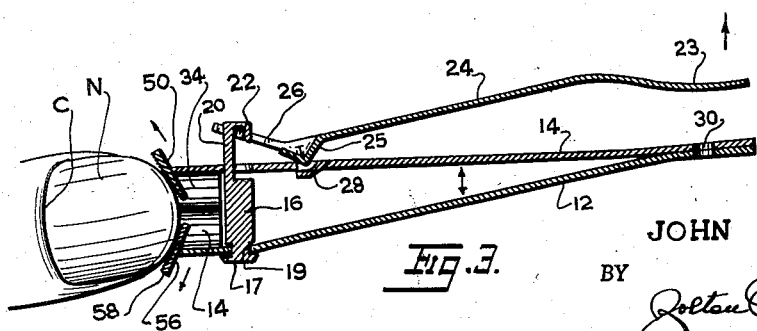
INVENTOR.
JOHN GUARDINO
BY
*ATTORNEY*

United States Patent Office 2,890,706
Patented June 16, 1959

2,890,706

COMBINATION MANICURING IMPLEMENTS

John Guardino, New York, N.Y.

Application June 19, 1958, Serial No. 743,222

6 Claims. (Cl. 132—75.5)

This invention relates to the art of manicure implements and particularly concerns an improved device for cleaning, cutting and filing nails and cuticle so that substantially an entire manicure treatment can be performed with one self-contained tool.

Heretofore it has required an array of scissors, clippers, files and similar tools to perform a satisfactory and complete manicure. The present invention has as its principal object to provide in a single tool a variety of blades, files, picks, and clippers so that a manicure can be performed more quickly and efficiently.

A further object is to provide a manicure implement with a pair of files operable by a lever for filing nails evenly and uniformly.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a manicure implement embodying the invention.

Fig. 2 is a longitudinal sectional view of the implement showing filing a fingernail.

Fig. 3 is a sectional view similar to Fig. 2 showing the implement in another filing position.

Fig. 4 is a plan view of the implement in a closed position.

Fig. 5 is a side elevational view of the implement in a closed position.

Referring to the drawings, there are shown two leaves 12 and 14 formed of spring steel. The leaves are elongated in form and are secured together at one end by spot welds 15. The other ends of the leaves are bent and biased apart. They are brought toward each other against spring tension in the leaves themselves. A post 16 is secured near the free end of leaf 12. This post extends perpendicularly thereto through an aperture 18 near the free end of leaf 14. Post 16 has an undercut portion 20 near its free end. In this undercut portion is engaged a crossbar portion 22 of lever 24. Lever 24 has a pressed out toe 25 in bent foot portion 26 adapted to provide a fulcrum bearing on leaf 14 so that the leaves can be drawn towards each other when the lever is lowered toward the leaves as shown in Figs. 2 and 3.

A recessed portion 28 is provided in leaf 14 adapted to receive toe 25 as the lever 24 is pivoted to close the leaves. This recessed portion prevents the lever from rotating angularly with post 16 on the leaves when the lever is being operated to close and open the leaves. Post 16 is provided with a head 17 and a recessed neck 19 engaged by leaf 12 so that the post is rotatable with the lever through 180° so that the lever can be reversed and placed in the closed position shown in Figs. 4 and 5. In this position the end of foot portion 26 and the other bent end 23 of the lever contact opposite ends of the leaf 14 while the leaves 12 and 14 are drawn together at their free ends. In this position post 16 is rotated so that its undercut recess 20 faces outwardly with bar 22 engaged thereunder at the top of the recess to hold the leaves closed. A pair of registering holes 30 are provided in leaves 12, 14 for hanging the tool on a suitable support when not in use.

The free end 32 of leaf 14 is broadened and opposite sides are curved inwardly toward leaf 12 to form two blades 34 and 36. Blade 34 has a short straight cutting edge 38 and blade 36 has a longer inwardly curved cutting edge 40. The free end 42 of leaf 12 is similarly broadened and opposite ends are curved inwardly toward leaf 14 to form short straight blade 44 and longer curved blade 46 with cutting edges 45 and 47, respectively. When the leaves are fully closed by lever 24, the cutting edges of the blades 34 and 44 come together and edges 40 and 47 of blades 36, 46 do likewise. The shorter blades serve as cuticle cutters and as nippers at acute angles and corners of the nail. The curved longer blades 36, 46 are nail cutters which provide a predetermined curvature to the ends of the nails.

Mounted by welding on the free end 32 of leaf 14 and angularly disposed thereto is a file element 50. This element has a coarse ribbed surface 52 facing outwardly. The outermost end of the element is a sharp double bladed tip 54 which serves as a pick or point for cleaning the ends of fingernails and for loosening cuticle. Thus, in Figs. 2 and 3 are shown a nail N with cuticle C and a tip end E which would be cleaned and treated by bladed tip 54. Another file element 56 is mounted on the free end 42 of leaf 12. This element has a double blade pointed tip 58 and a coarse ribbed surface 60. The flat ribbed surfaces of elements 50 and 56 are disposed at an angle ranging from 90° to 120° to each other depending on the positions of the ends 32 and 42 of the leaves. The file elements are arranged to abrade the end E of a fingernail uniformly on opposite marginal portions as clearly shown in Figs. 2 and 3, when the lever 24 is operated toward and away from the leaves 12 and 14.

Edges 38 and 40 are coplanar and edges 45 and 47 are also coplanar, so that when the lever 24 is pivoted to its innermost position as shown in Figs. 2 and 3, the edges meet in fine lines which lie on the same plane. The edges of the blades all terminate beyond the innermost edges of the file elements 50 and 56 as shown in Fig. 2 so that the blades serve as stop elements to limit inward movement of the file elements.

There has thus been provided in the single manicure implement, blades 36 and 46 for cutting the fingernail. Blades 34 and 44 trim the cuticle and corner portions of the nail. Tips 54 and 58 loosen the cuticle and clean the end of the nail. File elements 50 and 56 file the end of the nail to a desired roundness. The single lever 24 operates the blades and file elements. If desired, the file elements and tips 54 and 58 can be used with the device in the closed position shown in Figs. 4 and 5. By contacting the end of the fingernail with the two angularly disposed file elements and sliding the file elements over the nail end, a very fine finish can be obtained. In the action of Figs. 2 and 3, the file elements move in opposite directions while the lever is operated. In the closed position of the device both file elements move in the same direction together.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves.

2. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves, said lever having a bent foot with an outwardly extending toe providing a fulcrum for bearing on the other of said leaves.

3. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves, said lever having a bent foot with an outwardly extending toe providing a fulcrum for bearing on the other of said leaves, said other leaf having a recess adapted to receive said toe for preventing rotational movement of the lever during pivotal movement thereof.

4. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves, the free end of each leaf being bent inwardly to define longer and shorter blades, the longer blades being curved to cut a rounded contour on a fingernail while the shorter blades are straight to cut cuticle of the fingernail, blades on one leaf extending toward the blades on the other leaf with their edges terminating in planes beyond the innermost ends of said file elements to provide stop elements for limiting inward movement of the file elements.

5. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves, the free end of each leaf bent inwardly to define longer and shorter blades, the longer blades being curved to cut a rounded contour on a fingernail while the shorter blades are straight to cut cuticle of the fingernail, blades on one leaf extending toward the blades on the other leaf with their edges terminating in planes beyond the innermost ends of said file elements to provide stop elements for limiting inward movement of the file elements, said lever having a bent foot with an outwardly extending toe providing a fulcrum for bearing on the other of said leaves, said other leaf having a recess adapted to receive said toe for preventing rotational movement of the lever during pivotal movement thereof.

6. A manicure implement, comprising a pair of spring leaves secured together at one end and biased apart at the other end, a file element secured to the free end of each of the leaves, each file element having an abrading surface facing outwardly, the file elements on the respective leaves having their abrading surfaces disposed at an angle to each other, a post rotatably secured on one of the leaves, and a lever pivotally secured on the post for drawing the free ends of the leaves toward each other against spring bias in the leaves, the free end of each leaf being bent inwardly to define longer and shorter blades, the longer blades being curved to cut a rounded contour on a fingernail while the shorter blades are straight to cut cuticle of the fingernail, blades on one leaf extending toward the blades on the other leaf with their edges terminating in planes beyond the innermost ends of said file elements to provide stop elements for limiting inward movement of the file elements, said lever having a bent foot with an outwardly extending toe providing a fulcrum for bearing on the other of said leaves, said other leaf having a recess adapted to receive said toe for preventing rotational movement of the lever during pivotal movement thereof, each of the file elements having a double bladed tip for cleaning the fingernail and loosening the cuticle of the fingernail.

References Cited in the file of this patent
UNITED STATES PATENTS

| | | |
|---|---|---|
| 327,065 | Burton | Sept. 29, 1885 |
| 2,109,580 | Troya | Mar. 1, 1938 |